(12) United States Patent
Chen

(10) Patent No.: US 12,491,963 B2
(45) Date of Patent: Dec. 9, 2025

(54) KIND OF BRAKE UPPER PUMP WITH ADJUSTABLE FORCE ARM

(71) Applicant: Ningbo Lewis Sports Goods Co., Ltd., Cixi (CN)

(72) Inventor: Yonggang Chen, Cixi (CN)

(73) Assignee: Ningbo Lewis Sports Goods Co., Ltd., Cixi (CN)

( * ) Notice: Subject to any disclaimer, the term of this patent is extended or adjusted under 35 U.S.C. 154(b) by 0 days.

(21) Appl. No.: 18/762,893

(22) Filed: Jul. 3, 2024

(65) Prior Publication Data
US 2025/0019029 A1   Jan. 16, 2025

(30) Foreign Application Priority Data

Jul. 15, 2023 (CN) .......................... 202310871988.8

(51) Int. Cl.
*B62L 3/02* (2006.01)
(52) U.S. Cl.
CPC .................................... *B62L 3/023* (2013.01)
(58) Field of Classification Search
None
See application file for complete search history.

(56) References Cited

U.S. PATENT DOCUMENTS

2003/0183038 A1\* 10/2003 Cornolti .................... B60T 7/10
74/525

FOREIGN PATENT DOCUMENTS

| CN | 109552533 A | * | 4/2019 |
| CN | 218288013 U |   | 1/2023 |

\* cited by examiner

*Primary Examiner* — Vicky A Johnson
(74) *Attorney, Agent, or Firm* — Pilloff Passino & Cosenza LLP; Rachel K. Pilloff; Sean A. Passino

(57) ABSTRACT

A brake upper pump with an adjustable force arm, including a brake pump body, a brake handle, and a piston rod components extending into the brake pump body; The position where the user holds the brake lever is the grip input position, the connection between the brake pump body and the brake lever is the rotation fulcrum position, the connection between the piston rod assembly and the brake lever is the thrust output position; The distance between the rotation fulcrum position and the force-generating point of the user's hand-held brake lever forms the input force arm, and the distance between the rotation fulcrum position and the thrust output position forms the output force arm; A first force arm adjustable mechanism is provided at the rotation fulcrum, and the first force arm adjustable mechanism can change the rotation center of the brake lever relative to the brake pump body.

8 Claims, 12 Drawing Sheets

KIND OF BRAKE UPPER PUMP WITH ADJUSTABLE FORCE ARM

TECHNICAL FIELD

The invention relates to the technical field of hydraulic brake products, in particular to a brake upper pump with an adjustable force arm.

BACKGROUND ART

A brake is a device that has the function of decelerating, stopping or maintaining a stopped state of moving parts (or moving machinery). It is a mechanical part that stops or slows down the moving parts in the machine. Commonly known as brakes. The brake is mainly composed of frame, brake parts and control device. Some brakes are also equipped with automatic adjustment devices for brake clearance. In order to reduce the braking torque and structural size, the brake is usually installed on the high-speed shaft of the equipment. However, large equipment with higher safety requirements (such as mine hoists, elevators, etc.) should be installed on low-speed shafts close to the working parts of the equipment.

In vehicles such as bicycles, the device used to control the brakes is the brake (commonly known as the brake lever). The brake lever is a handle when braking. It is used in bicycle brake lever, stroller lever, electric vehicle brake lever, motorcycle brake handles, etc. Traditionally, during the installation process of brake wires on electric vehicles, bicycles, tricycles and other vehicles, traditional tools such as wire cutters and wrenches are generally used to tighten them with brute force. This traditional wire tightening method has many shortcomings and is difficult to operate. For example: the wire easily slips out of the wire cutters or wrenches, and it is not easy to adjust the tightness, which is particularly time-consuming and labor-intensive. In order to pursue braking efficiency and accuracy, hydraulic brakes are widely used in vehicles on the market (such as cars, motorcycles and bicycles). The principle is to combine one end of a brake hose with the output end of the internal oil circuit of a brake lever seat, and the other end of the brake hose is combined with a disc brake, which can push a piston in the internal oil circuit by pressing the handle. The lever allows the pressure in the oil circuit to act on the disc brake through the brake oil pipe, thereby forming the operation of the disc brake.

Torque represents the physical quantity of the rotational effect produced when a force acts on an object. The product of the force and the moment arm is called the moment of the force about the axis of rotation. That is, the magnitude of the moment of a force on a certain point is the length of the perpendicular line drawn from the point to the line of action of the force (i.e., the moment arm) multiplied by the magnitude of the force. Its direction is perpendicular to the vertical line and the plane formed by the force is determined by the right-hand spiral rule of moments. Torque can cause an object to gain angular acceleration and change its momentum moment. For the same object, the greater the torque, the easier it is to change the rotational state.

Torque is a physical quantity that exerts a rotational effect on an object. It can be divided into the moment of a force about an axis and the moment of a force about a point. That is: $M=r \times F$. Where r is the position vector from the rotation axis to the force point, F is the vector force; the torque is also a vector.

When the brake pump works, the brake handle rotates relative to the brake pump body to push the piston rod components forward, and its force has the same effect as the torque. That is, the connection point between the brake pump body and the brake lever is set as the rotation fulcrum position, and the distance between the rotation fulcrum position and the force-generating position of the user's hand-held brake lever forms the input force arm. The distance between the rotation fulcrum position and the thrust output position forms the output moment arm, and the input torque is equal to the output torque. Assuming that the input and output torques remain unchanged, if the piston thrust is required to act more directly and the user's grip strength is reduced, the input moment arm needs to be increased; In addition, if the output stroke needs to be increased to make the brake feel more linear, the input force arm needs to be reduced.

In the prior art, refer to the patent document CN218288013U, which discloses a brake cylinder with an adjustable lever, including a brake lever, a lever seat, a cylinder body, and a piston components. The piston assembly is arranged on the oil cylinder body, and the brake lever and lever base are respectively hinged on the oil cylinder body. A compression spring is arranged between the brake lever and the lever seat. The brake lever is rotatably provided with a knob adjuster for adjusting the opening and closing degree of the brake lever. The knob adjuster includes a cam and a knob connected to each other. The handle base is provided with a pushing part and a pressing part. The pushing part is connected to the piston rod of the piston assembly and is used to push the piston rod forward and drive the brake. The pressing part is in contact with the cam. The utility model uses different distances between the outer surface of the cam and the cam shaft to realize the opening size of the brake lever in the reset state, that is, the distance between the brake lever and the handlebar. Users can adjust it according to the size of their palms to facilitate driving. It is also easy to adjust and can be applied to the brake lever of a disc brake. A knob adjuster is provided on the brake lever, and a pressing portion is provided on the handle base to offset the cam of the knob adjuster; The distance between the outer surface of the cam and the cam shaft is different, so as to realize the opening size of the brake lever in the reset state, that is, the distance between the brake lever and the handlebar. Users can adjust it according to the size of their palms to facilitate driving. When in use, you only need to turn the knob adjuster to adjust, which is convenient and quick. At the same time, the handle base is equipped with a pushing part and a pressing part, so that the knob adjuster can be applied to the brake handle of a disc brake.

Although the above-mentioned patented brake technology has a certain adjustment function, its structure is backward, its practicability is not strong, and it is not popular in the market. After comparison, the applicant found that it has at least the following defects: 1. What is actually adjusted in the patent is the distance between the handlebar and the brake lever. In order to adapt to the palm size of different users, what is adjusted is the grip distance; The rotational fulcrum position connecting the brake handle and the pump body is a fixed structure, that is, the input force arm and the output force arm are not adjustable, resulting in that it does not have the function of truly adjusting the torque; 2. For the same user, the brake lever in the existing technology cannot adjust the ratio between the piston push rod components stroke and the piston thrust during braking according to the user's own needs, nor can it adjust the ratio between the hand grip and the piston thrust; 3. In order to meet the needs of different users for grip strength and piston thrust, the brake pump needs to be customized. That is, if a single user needs brakes with different braking effects, multiple different brake pumps need to be purchased, which greatly improves the use of the user's cost.

When using the horizontal bar brake pump, the user holds one end of the brake lever, and the piston push rod components is connected to the other end of the brake lever. At the same time, the connection between the brake lever and the brake pump body is the center of rotation. During operation, the rotation center is located between the two ends of the brake lever, so one end presses down and the other end pushes out, so the lever balance condition is met, and the lever principle is applied for force analysis.

In the vertical cylinder brake upper pump, the connection point between the brake lever and the brake body is the handle rotation center, and the rotation center is constant. A certain point on the brake handle is connected and interacts with the piston push rod components to transmit downforce. During operation, the rotation center is located at the end of the brake lever. Therefore, when the hand is pressed down, the piston push rod components is also pressed down at the same time. The lever balance condition is not fully satisfied, so the lever principle is not applicable for force analysis.

In the present invention, the main purpose is to improve and upgrade the defects existing in the structure of the axial cylinder brake, which is hereby explained.

Technical Solution

In order to overcome the above-mentioned shortcomings of the prior art, the present invention provides a brake pump with an adjustable force arm to provide the user with different braking effects before and after adjustment according to the user's own needs. That is to say, different piston thrusts can be output under the same grip strength to meet diverse needs.

The technical solution of the present invention to solve the technical problem is: a brake upper pump with an adjustable force arm, It includes a brake pump body, a brake lever that is rotatably connected to the brake pump body, and a piston push rod components that is connected to the brake lever and at least partially extends into the brake pump body;

The position where the user holds the brake handle is the grip input position, and the connection between the brake pump body and the brake lever is the rotation fulcrum position. The connection between the piston push rod components and the brake lever is the thrust output position, and the rotation fulcrum position is between the grip input position and the thrust output position;

The distance between the rotation fulcrum position and the force-generating point of the user's hand-held brake lever forms the input force arm, and the distance between the rotation fulcrum position and the thrust output position forms the output force arm;

A first force arm adjustable mechanism is provided at the rotation fulcrum, and the first force arm adjustable mechanism can change the rotation center of the brake lever relative to the brake pump body;

When the first force arm adjustable mechanism brings the rotation center close to the piston push rod components, the input force arm is increased and the output force arm is reduced, thereby increasing the ratio of the input force arm to the output force arm;

When the first force arm adjustable mechanism moves the rotation center away from the piston push rod components, the input force arm is reduced and the output force arm is increased, thereby reducing the ratio of the input force arm to the output force arm.

Regarding the above technical method, a further arrangement is that a pivot mechanism is provided at the rotation fulcrum position;

The pivot mechanism includes a rotating connecting shaft, a first rotating bearing installed on the rotating connecting shaft, and a first connecting screw;

Wherein, a first connection hole is provided at the connection between the brake pump body and the brake lever, and the rotary connection shaft is inserted into the first connection hole;

The first connecting screw limits the first rotating bearing on the rotating connecting shaft, The rotary connection shaft is at least partially inserted into the first rotary bearing, and the outer wall of the first rotary bearing is close to the brake pump body.

In some preferred embodiments of the present invention, the first force arm adjustable mechanism includes an eccentric hole opened on the rotating connection shaft, The first connecting screw is assembled into the eccentric hole to form the rotation center;

The rotary connection shaft can rotate relative to the first connection hole, thereby changing the position of the eccentric hole, and then adjusting the rotation fulcrum position to increase or decrease the ratio of the input force arm to the output force arm.

A further preferred configuration of the above embodiment is that it further includes a distance-adjusting mechanism acting on the first force arm adjustable mechanism.

A specific way is that the pitch-adjusting mechanism includes a pitch-adjusting worm and a worm gear tooth thread formed on the rotating connection shaft;

The pitch-adjustable worm is threadedly engaged with the worm gear teeth, thereby driving the rotating connecting shaft to rotate to adjust the position of the eccentric hole relative to the thrust output position.

Furthermore, the distance-adjusting mechanism also includes a circlip, and the distance-adjusting worm is connected to the brake lever through the circlip limit, so that the distance-adjusting worm can rotate relative to the brake lever and drive the rotation connecting shaft to rotate.

Another specific way is that the distance adjustment mechanism includes several positioning holes and positioning fasteners opened on the outer periphery of the rotating connection shaft. The positioning fastener can be inserted into any positioning hole so that the rotating connecting shaft is fixedly connected to the brake lever.

In the present invention, a transmission reversing mechanism is provided at the thrust output position, and the piston push rod components forms a transmission cooperation with the brake lever through the transmission reversing mechanism.

Specifically, the transmission reversing mechanism includes a fixed connecting shaft, a second rotating bearing installed on the fixed connecting shaft, and a second connecting screw;

Wherein, the piston push rod components forms a fixed fit with the fixed connecting shaft, and the second connecting screw connects the piston push rod components to the fixed connecting shaft, The fixed connecting shaft passes through the second rotating bearing, and the outer wall of the second rotating bearing is close to the brake lever.

In some preferred embodiments of the present invention, the first force arm adjustable mechanism includes a plurality of mounting holes opened on the brake lever, and the distance between each mounting hole and the thrust output position is different; The pivot mechanism can be assembled into any one of the mounting holes to form the rotation center.

The beneficial effects of the present invention are:

1. Through the setting of the first force arm adjustable mechanism, the ratio of the input force arm and the output force arm can be increased or reduced. Therefore, if the user's strength is small and he needs to obtain a larger and more direct piston thrust, he can increase the input force arm to obtain a larger piston thrust F2 while keeping the grip force F1 unchanged; If the user has greater strength and needs to obtain a longer and more flexible braking feel, he can reduce the input force arm to obtain a smaller piston thrust F2 while maintaining the same grip force F1. Therefore, a larger stroke of the brake handle is required to achieve the same piston thrust F2.

2. The first force arm adjustable mechanism can be integrated into the pivot mechanism, so that most of the structural solutions of the existing brake upper pump can be directly borrowed, without the need for redesign, production, and verification. The overall solution is more reasonable, and the structure is stable and reliable enough. Easy to process and produce.

3. The setting of the distance-adjusting mechanism has a simple and reasonable structure and is convenient to operate, which is conducive to the user to directly adjust the first force arm adjustable mechanism.

4. In the present invention, the rotation fulcrum position is between the grip input position and the thrust output position, which is suitable for the horizontal bar brake pump.

Figure 1:
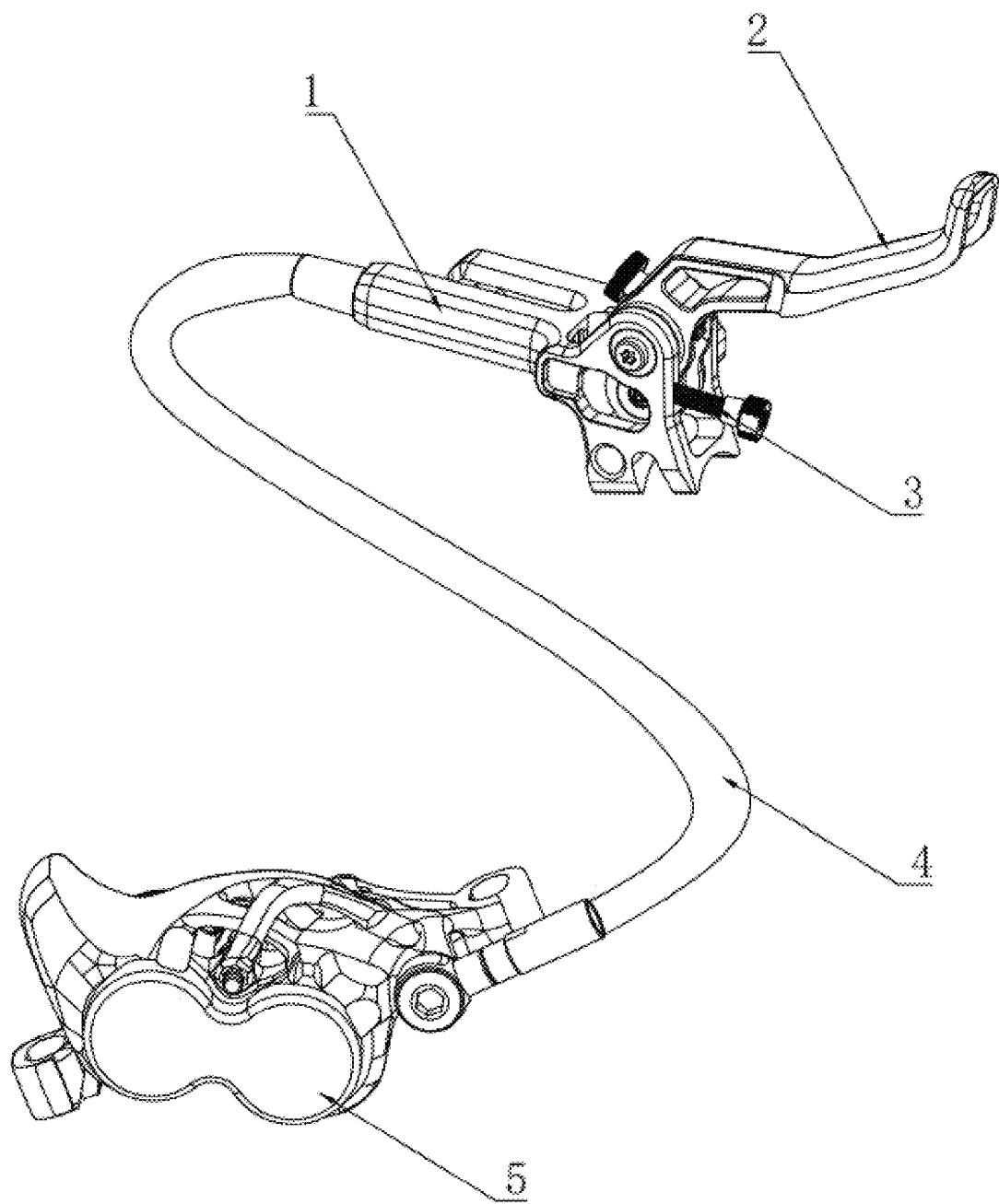
FIG. 1 is a schematic diagram of the application of the present invention.
Figure 2:
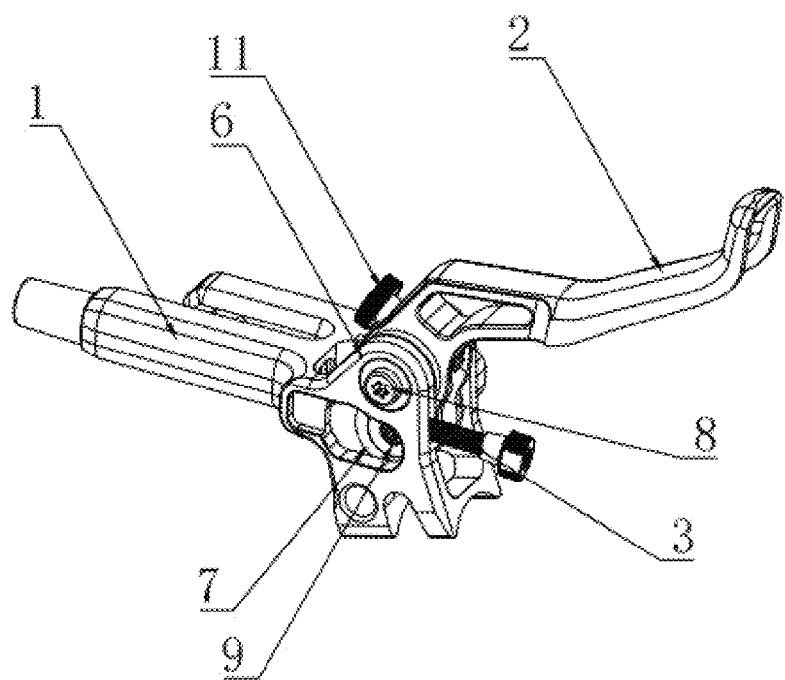
FIG. 2 is a schematic structural diagram of the present invention (Embodiment 3).

In the picture: 1. Brake pump body; 2. Brake lever; 3. Piston rod components; 4. Hose; 5. Brake down Pump; 6. Rotation fulcrum position; 7. Thrust output position; R1, input arm; R2, output arm; F1, grip; F2, piston thrust; 8, Pivot Mechanism; 801, rotating connecting shaft; 8011, Eccentric hole; 802, the first rolling bearing; 803, First connecting screw; 9. Transmission reversing mechanism; 901. Fixed connecting shaft; 902, Second rolling bearing; 903. Second connection screw; 10. First connection hole; 11. Pitch adjustment mechanism; 1101. Adjustable pitch worm; 1102. Worm gear tooth thread; 1103. circlip; 1104. Locking screw; 1105. Screw head part; 1106. Knurled; 1107. Anti-recession groove; 1108. Positioning holes; 1109. Positioning fasteners; 12. Installation hole; a. Center of rotation; 13. Hand.

MODE FOR INVENTION

The technical solutions in the embodiments of the present invention will be clearly and completely described below with reference to the accompanying drawings in the embodiments of the present invention. Obviously, the described embodiments are only some of the embodiments of the present invention, rather than all the embodiments. Based on the embodiments of the present invention, all other embodiments obtained by those of ordinary skill in the art without creative efforts fall within the scope of protection of the present invention.

Embodiment 1

Referring to FIGS. 1 to 12, a brake upper pump with adjustable force arm is shown. It includes a brake pump body 1, a brake lever 2 that is rotatably connected to the brake pump body 1, and a piston push rod components 3 that is connected to the brake lever 2 and at least partially extends into the brake pump body 1; When in use, the brake pump body 1 is connected to the lower brake pump 5 through the oil pipe 4, and brake oil is injected into the brake pump body 1. When the piston push rod components 3 is pushed forward, the brake oil can be pushed to the lower brake pump 5 through the oil pipe 4. The position where the user holds the brake handle 2 is the grip force F1 input position, the connection between the brake pump body 1 and the brake lever 2 is the rotation fulcrum position 6, and the connection between the piston push rod components 3 and the brake handle 2 is the thrust output position 7, the rotation fulcrum position 6 is between the grip force F1 input position and the thrust output position 7; The distance between the rotation fulcrum position 6 and the force-generating point of the brake handle 2 formed by the user forms the input force arm R1, and the distance between the rotation fulcrum position 6 and the thrust output position 7 forms the output force arm R2.

In the prior art, the rotation fulcrum 6 is fixed and unique, and the connection between the piston push rod components 3 and the brake lever 2 is also fixed and unique. Therefore, the ratio of the input force arm R1 to the output force arm R2 in a single brake upper pump is constant. In the present invention, a first force arm adjustable mechanism is provided at the rotation fulcrum position 6, and the first force arm adjustable mechanism can change the rotation center a of the brake lever 2 relative to the brake pump body 1; When the first lever arm adjustable mechanism moves the rotation center a close to the piston push rod components 3, the input lever arm R1 is increased and the output lever arm R2 is reduced. Then increase the ratio of the input force arm R1 and the output force arm R2; When the first force arm adjustable mechanism moves the rotation center a away from the piston push rod components 3, the input force arm R1 is reduced, and the output force arm R2 is increased at the same time. Then the ratio of the input lever arm R1 to the output lever arm R2 is reduced.

The above structure is the main solution of the present invention, which realizes the ratio adjustment of the input force arm R1 and the output force arm R2 through the arrangement of the first force arm adjustable mechanism.

The corresponding formula of torque in the brake upper pump is: grip force F1=input moment arm R1/input moment M1, piston thrust F2=output moment arm R2/output moment M2. In the same brake pump, input torque M1=output torque M2.

From the above, it can be seen that if the user has small strength and needs to obtain a larger and more direct piston thrust F2, he can obtain a larger piston thrust F2 by increasing the input moment arm R1, so that the grip force F1 remains unchanged; If the user has greater strength and needs to obtain a longer and more flexible braking feel, he can reduce the input force arm R1 to obtain a smaller piston thrust F2 while maintaining the same grip force F1. Therefore, a larger stroke of the brake handle 2 is required to achieve the same piston thrust F2. The greater the piston thrust F2, that is, the greater the amount of brake oil pushed forward to the lower brake pump 5, the more obvious the braking effect will be.

The rotation fulcrum position 6 serves as the rotation axis when the brake lever 2 is used, that is, the brake handle 2 can rotate relative to the brake pump body 1 with the rotation fulcrum position 6 as the rotation center a. In order to achieve rotational fit, the preferred method adopted is: a pivot mechanism 8 is provided at the rotational fulcrum position 6. Specifically, the pivot mechanism 8 includes a rotating connecting shaft 801, a first rotating bearing 802 installed on the rotating connecting shaft 801, and a first connecting screw 803. Among them, a first connection hole 10 is opened at the connection between the brake pump body 1 and the brake lever 2 to provide an installation space for the rotation connection shaft 801, so that the rotation connection shaft 801 can be inserted into the first connection hole 10; The first connecting screw 803 limits the first rotating bearing 802 on the rotating connecting shaft 801, and the rotating connecting shaft 801 is at least partially inserted into the first rotating bearing 802, And the outer wall of the first rotating bearing 802 is close to the brake pump body 1. Under the condition that the first rotating bearing 802 can provide rotational support, a limit is formed in its non-rotating direction to prevent it from leaving the work station to ensure stability during use. This allows the brake handle 2 to rotate relative to the brake pump body 1 through the action of the first rotation bearing 802 when it is stressed.

The thrust output position 7 serves as the output center when the brake lever 2 is used. It needs to convert the rotational force of the brake handle 2 into the forward thrust of the piston push rod components 3. In order to realize the power reversal and transmission functions, it is also necessary to realize the rotational cooperation between the piston push rod components 3 and the brake lever 2. The preferred structure adopted is: The thrust output position 7 is provided with a transmission reversing mechanism 9, and the piston push rod components 3 forms a transmission cooperation with the brake lever 2 through the transmission reversing mechanism 9. Specifically, the transmission reversing mechanism 9 includes a fixed connecting shaft 901, a second rotating bearing 902 installed on the fixed connecting shaft 901, and a second connecting screw 903; Wherein, the piston push rod components 3 forms a fixed fit with the fixed connecting shaft 901, and the second connecting screw 903 connects the piston push rod components 3 to the fixed connecting shaft 901, The fixed connecting shaft 901 is inserted into the second rotating bearing 902, and the outer wall of the second rotating bearing 902 is close to the brake handle 2.

In the present invention, the components of the pivot mechanism 8 and the transmission reversing mechanism 9 are relatively close, and the pivot mechanism 8 plays the role of converting the grip force F1 into a rotational force. The transmission reversing mechanism 9 plays the role of converting rotational force into forward thrust. The other components are similar to those of the prior art and have similar working mechanisms, which will not be described in detail here.

Embodiment 2

In the present invention, the above-mentioned first force arm adjustable mechanism has various optional composition schemes, and a preferred method is provided here, specifically as follows: Referring to FIGS. 3 to 6, the first force arm adjustable mechanism includes an eccentric hole 8011 opened in the rotation connection shaft 801, and the first connecting screw 803 is assembled into the eccentric hole 8011, To form the rotation center a. Every time the eccentric hole 8011 changes, a new rotational fulcrum position 6 is formed (that is, the rotational axis of the torque during braking).

During the adjustment process, the rotary connecting shaft 801 can rotate relative to the first connecting hole 10, thereby causing the position of the eccentric hole 8011 to change, then adjusting the rotation fulcrum position 6 can cause the position of the eccentric hole 8011 to change relative to the force generation point of the user's hand-held brake handle 2 and the thrust output position 7, so as to adjust the size of the input force arm R1 and the output force arm R2, to increase or decrease the ratio of the input lever arm R1 to the output lever arm R2.

Embodiment 3

As the structural basis of the second basic embodiment, this embodiment provides two preferred distance-adjusting mechanisms 11 that act on the first force arm adjustable mechanism.

1. Referring to FIGS. 3 to 8, the pitch-adjusting mechanism 11 includes a pitch-adjusting worm 1101 and a worm gear thread 1102 formed on the rotating connecting shaft 801; The pitch-adjustable worm 1101 meshes with the worm gear tooth thread 1102, thereby driving the rotation connecting shaft 801 to rotate to adjust the position of the eccentric hole 8011 relative to the thrust output position 7. Furthermore, in order to install and use the pitch-adjusting worm 1101, the pitch-adjusting mechanism 11 also includes a circlip 1103. The pitch-adjusting worm 1101 is limitedly connected to the brake handle 2 through the circlip 1103. Therefore, the adjustable pitch worm 1101 can rotate relative to the brake handle 2 and drive the rotation connecting shaft 801 to rotate. Therefore, the pitch-adjustable worm 1101 can be manually operated to rotate under the limit of the circlip 1103, so as to drive the rotation connecting shaft 801 to rotate through the worm gear tooth thread 1102, thereby adjusting the relative position of the eccentric hole 8011.

The structure of the pitch-adjustable worm 1101 and the worm gear thread 1102 is a preferred example, and does not limit the invention in any way. Other approximate methods such as bevel gears and bevel threads can also be used. Any simple modifications, changes and equivalent structural changes made to the above embodiments still fall within the protection scope of the technical solution of the present invention.

Preferably, a locking screw 1104 is also included. After the first force arm adjustable mechanism is adjusted, it needs to be locked in the current position, that is, the locking screw 1104 is screwed in. This allows the locking screw 1104 to form a structural interference with the first adjustable arm mechanism to limit the continued movement of the first adjustable arm mechanism and achieve a limiting locking effect. When it is necessary to adjust the first force arm adjustable mechanism, loosen the locking screw 1104 and stagger the structure to eliminate interference, thereby allowing the first force arm adjustable mechanism to continue moving.

Preferably, one end of the pitch-adjustable worm 1101 has a screw head portion 1105 exposed outside the brake handle 2, and the screw head portion 1105 has knurls 1106, to improve the friction when the user's hand comes into contact, making the operation easier. The other end of the pitch-adjustable worm 1101 has an anti-retreat groove 1107. At least a part of the circlip 1103 is inserted into the anti-retreat groove 1107, and the other part forms a limiting fit with the brake handle 2, to achieve the function of limiting and preventing falling off.

Figure 3:
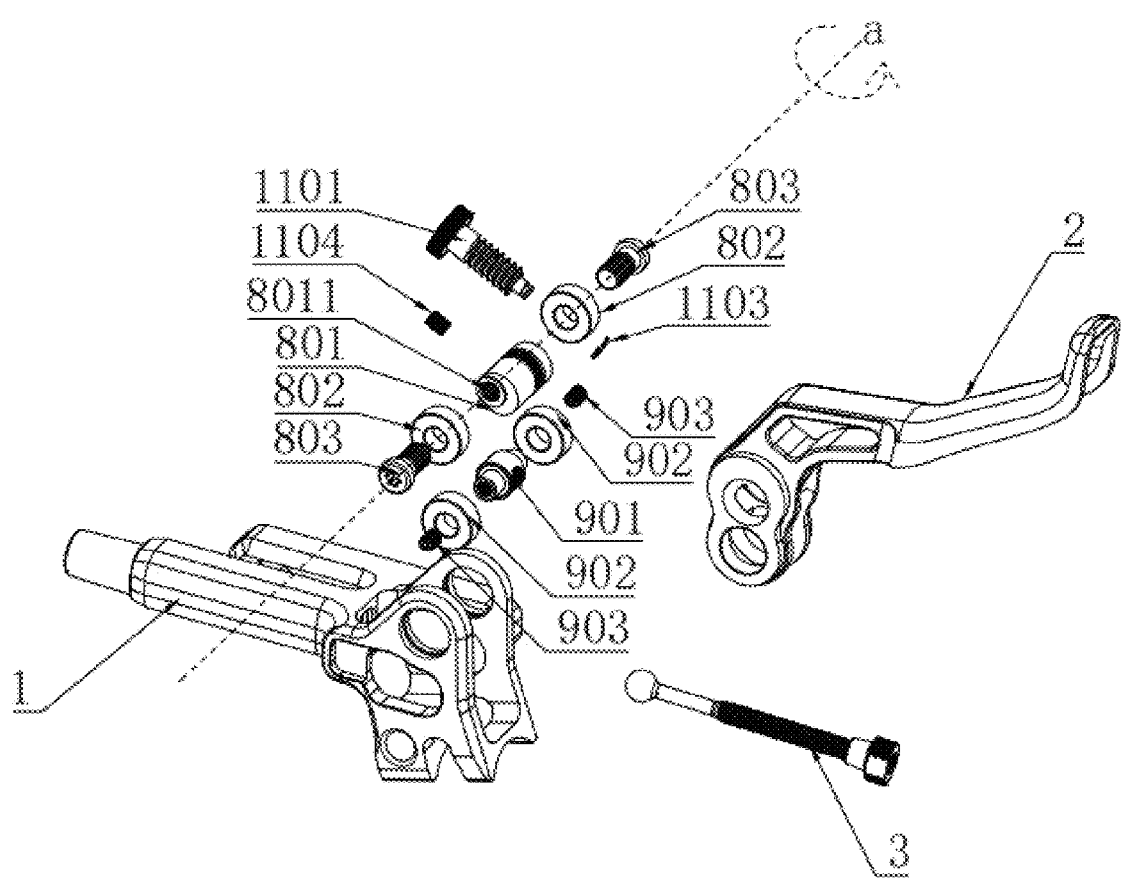
FIG. 3 is an exploded view of a partial structure of the present invention (Embodiment 3).
Figure 4:
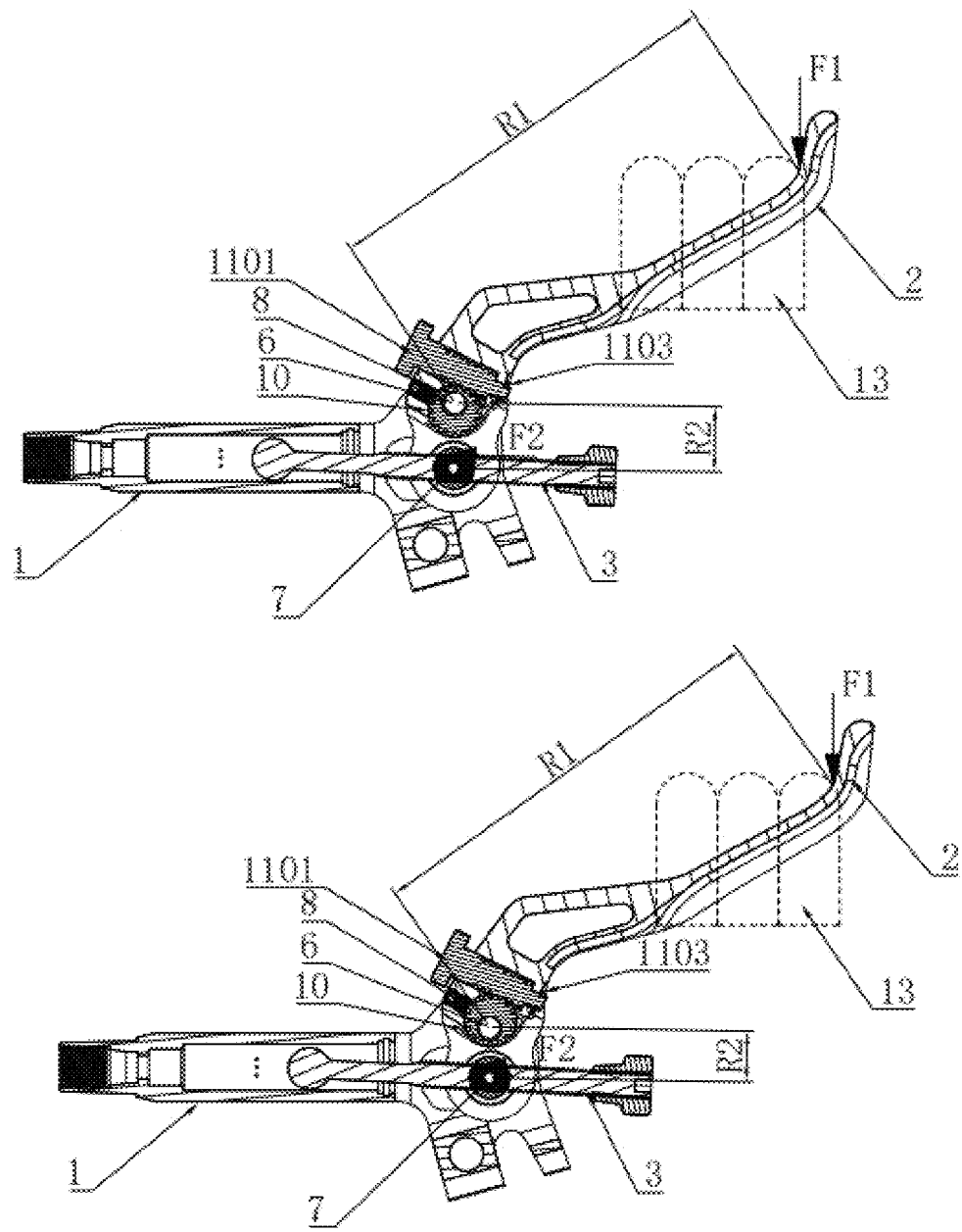
FIG. 4 is a comparative schematic diagram before and after adjusting the force arm of the present invention (Embodiment 3).
Figure 5:
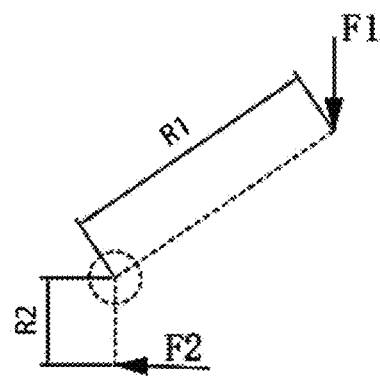
FIG. 5 is a schematic diagram of the torque comparison before and after the moment arm is adjusted according to the present invention.
Figure 5:
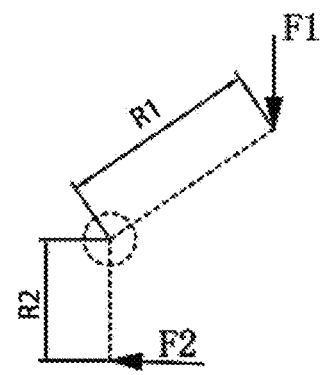
Figure 6:
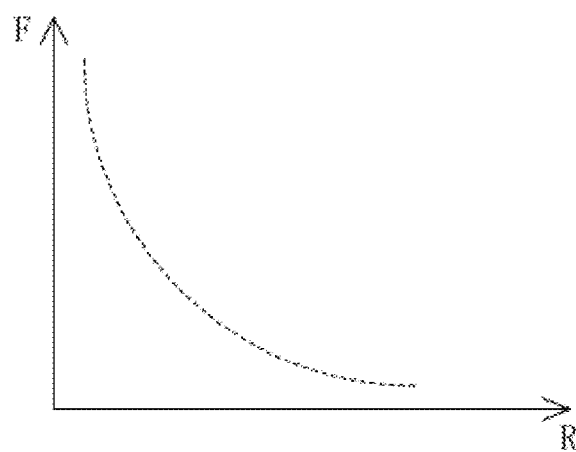
FIG. 6 is a schematic diagram of the principle of torque change.
Figure 7:
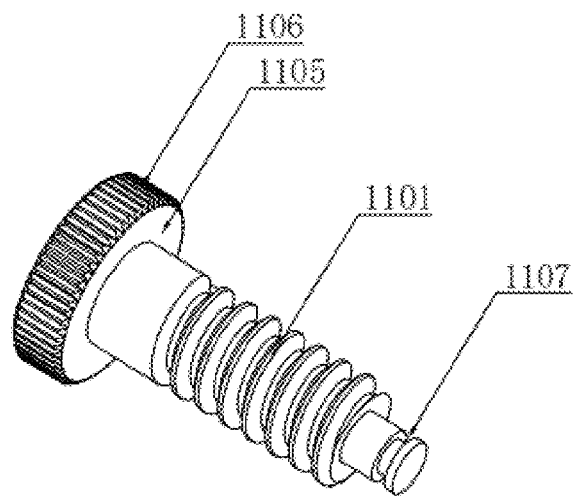
FIG. 7 is a schematic structural diagram of the first example pitch-adjustable worm in Embodiment 3.
Figure 8:
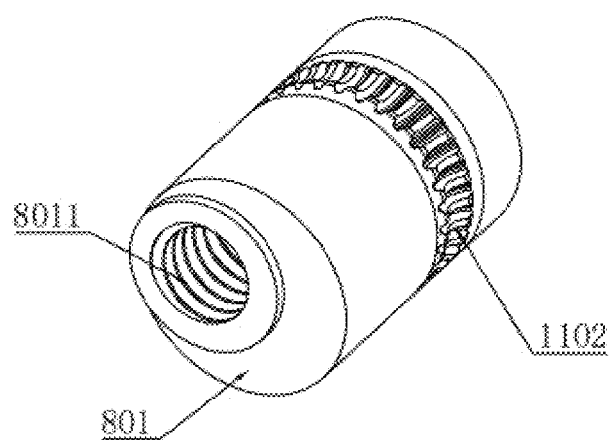
FIG. 8 is a schematic structural diagram of a first example of a rotary connection shaft in Embodiment 3.

2. Referring to FIGS. 3 to 4, the distance adjustment mechanism 11 includes a number of positioning holes 1108 and positioning fasteners 1109 opened on the outer circumference of the rotating connection shaft 801. The positioning fastener 1109 can be inserted into any positioning hole 1108 so that the rotation connecting shaft 801 is fixedly connected to the brake handle 2. During use, after loosening the positioning fastener 1109, the user can directly act on the pivot mechanism 8 to rotate the rotation connecting shaft 801 therein, thereby adjusting the relative position of the eccentric hole 8011; After adjustment, the positioning fastener 1109 is tightened again so that the rotating connecting shaft 801 is fixed at the current position and prevents the rotating connecting shaft 801 from loosening.

Embodiment 4

Figure 9:
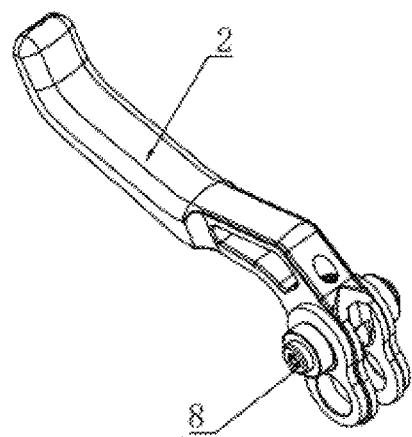
FIG. 9 is a partial assembly schematic diagram of the second example in Embodiment 3.
Figure 10:
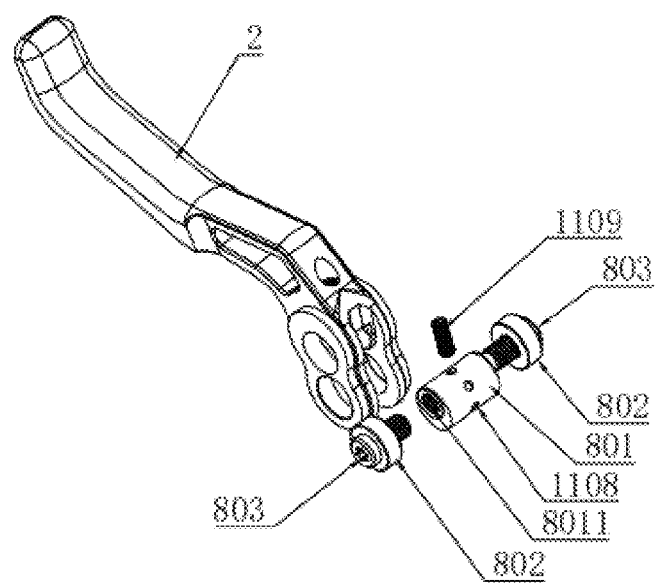
FIG. 10 is an exploded view of a partial structure of the second example in Embodiment 3.
Figure 11:
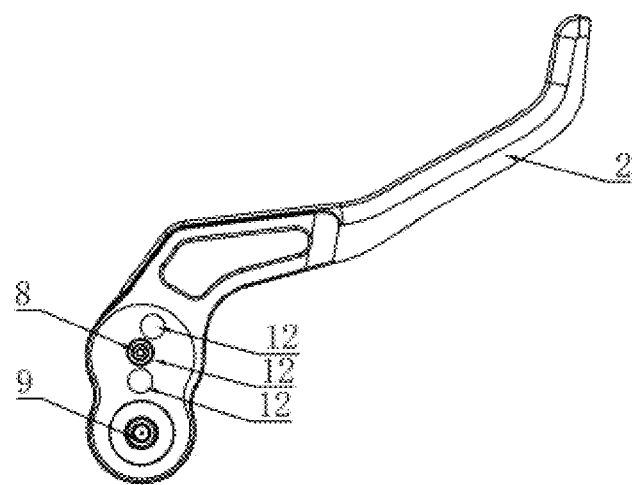
FIG. 11 is a partial structural diagram of Embodiment 4.
Figure 12:
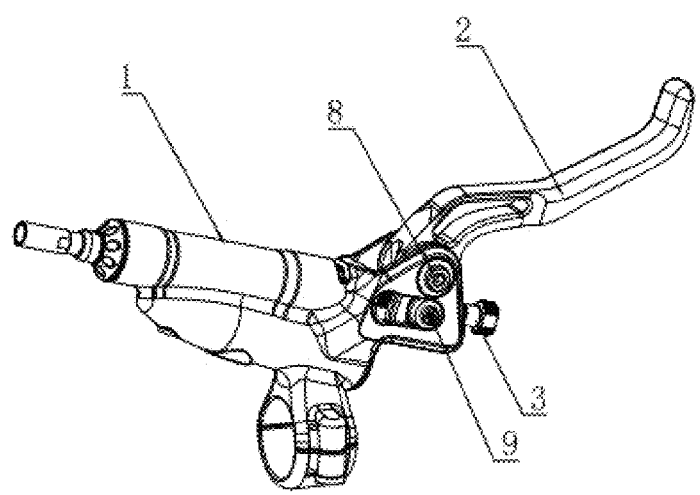
FIG. 12 is a schematic structural diagram of the prior art.

In the present invention, the optional composition schemes of the first force arm adjustable mechanism mentioned above are various. Another preferred method is provided here, which is different from the second embodiment and is as follows: Referring to FIGS. 9 and 10, the first adjustable arm mechanism includes a plurality of mounting holes 12 opened on the brake lever 2, and the distance between each mounting hole 12 and the thrust output position 7 is different. During use, the user can assemble the pivot mechanism 8 into any of the mounting holes 12 according to his or her own needs to form an actual working rotation fulcrum position 6. This embodiment serves as a support case for the first force arm adjustable mechanism in Embodiment 1. Compared with Embodiment 2, multiple mounting holes 12 in different positions need to be preformed on the brake lever 2 for the user to choose. Therefore, it can also achieve the function of realizing different ratios of the input force arm R1 and the output force arm R2 in the same brake upper pump.

Embodiment 5

In some preferred embodiments of the present invention, in order to make the adjustment methods of the input force arm R1 and the output force arm R2 more diverse, a second force arm adjustable mechanism is also provided at the thrust output position 7, to increase or decrease the ratio of the input lever arm R1 to the output lever arm R2. The second adjustable arm mechanism may adopt the same or similar structure as the first adjustable arm mechanism in the previous embodiment, which will not be described again here.

The above are only preferred embodiments of the present invention and are not intended to limit the present invention in any way. Any simple modifications, changes and equivalent structural changes made to the above embodiments based on the technical essence of the invention still fall within the protection scope of the technical solution of the invention.

The invention claimed is:

1. A brake upper pump with an adjustable force arm, including:
    a brake pump body, a brake lever rotatably connected to the brake pump body at a rotation fulcrum position located between a grip input position and a thrust output position, and a piston rod component connected to the brake lever and at least partially extending into the brake pump body;
    the grip input position corresponds to a position where a user holds the brake lever, and the thrust output position corresponds to a position where the piston rod component connects to the brake lever;
    wherein, an input force arm defined as a distance between the rotation fulcrum position and a force-generating point on the brake lever held by the user, and an output force arm defined as a distance between the rotation fulcrum position and the thrust output position;
    a first force arm adjustable mechanism is provided at the rotation fulcrum position, configured to change a rotation center of the brake lever relative to the brake pump body such that:
    when the first force arm adjustable mechanism moves the rotation center close to the piston rod component, the input force arm is increased and the output force arm is reduced, thereby increasing the ratio of the input force arm to the output force arm;
    when the first force arm adjustable mechanism moves the rotation center away from the piston rod component, the input force arm is reduced and the output force arm is increased, thereby reducing the ratio of the input force arm to the output force arm;
    a pivot mechanism is provided at the rotation fulcrum position;
    the pivot mechanism includes a rotating connecting shaft, a first rotating bearing installed on the rotating connecting shaft, and a first connecting screw;
    wherein, a first connection hole is formed at the connection between the brake pump body and the brake lever, and the rotating connecting shaft is inserted into the first connection hole;
    the first connecting screw being configured to limit the first rotating bearing on the rotating connecting shaft, the rotating connecting shaft is at least partially inserted into the first rotating bearing, and an outer wall of the first rotating bearing is adjacent to the brake pump body;
    the first force arm adjustable mechanism includes an eccentric hole formed on the rotating connection shaft, and the first connecting screw is assembled into the eccentric hole to form the rotation center;
    the rotating connecting shaft is rotatable relative to the first connection hole, thereby changing the position of the eccentric hole, and adjusting the rotation fulcrum position to increase or decrease the ratio of the input force arm to the output force arm.

2. The brake upper pump with the adjustable force arm according to claim 1, further comprising a distance-adjusting mechanism configured to act on the first force arm adjustable mechanism.

3. The brake upper pump with the adjustable force arm according to claim 2, wherein the pitch-adjusting mechanism includes a pitch-adjusting worm and a worm gear tooth thread formed on the rotating connection shaft;

the pitch-adjustable worm being threadedly engaged with the worm gear teeth to drive the rotating connecting shaft to rotate, thereby adjusting the position of the eccentric hole relative to the thrust output position.

4. The brake pump with the adjustable force arm according to claim 3, wherein the distance adjustment mechanism further includes a circlip, and the distance adjustment worm is connected to the brake lever via the circlip as a limiter, such that the pitch-adjustable worm is rotatable relative to the brake lever and drive the rotating connecting shaft to rotate.

5. The brake upper pump with the adjustable force arm according to claim 2, wherein the distance adjustment mechanism includes a plurality of positioning holes and positioning fasteners disposed on the outer periphery of the rotating connection shaft, the positioning fastener being insertable into any positioning hole to fixedly connect the rotating connecting shaft to the brake lever.

6. The brake upper pump with the adjustable force arm according to claim 1, wherein a transmission reversing mechanism is provided at the thrust output position, and the piston rod component is operatively coupled to the brake lever via the transmission reversing mechanism.

7. The brake upper pump with the adjustable force arm according to claim 6, wherein the transmission reversing mechanism includes a fixed connecting shaft, a second rotating bearing installed on the fixed connecting shaft, and a second connecting screw;

wherein, the piston rod components is fixedly fitted to the fixed connecting shaft, and the second connecting screw connects the piston rod components to the fixed connecting shaft, the fixed connecting shaft extends through the second rotating bearing, and an outer wall of the second rotating bearing is adjacent to the brake lever.

8. The brake upper pump with the adjustable force arm according to claim 1, wherein the first force arm adjustable mechanism includes a plurality of mounting holes formed on the brake lever, and each mounting hole having a different distance from the thrust output position; and the pivot mechanism can be assembled into any one of the mounting holes to form the rotation center.

* * * * *